US007978853B2

(12) United States Patent
Krishnapuram et al.

(10) Patent No.: US 7,978,853 B2
(45) **Date of Patent: *Jul. 12, 2011**

(54) SYSTEM AND COMPUTER PROGRAM PRODUCT FOR PROTECTING AUDIO CONTENT

(75) Inventors: Raghuram Krishnapuram, Bangalore (IN); Nandita J. Mahajan, New Delhi (IN); L. Venkat Subramaniam, Gurgaon (IN); Vivek Tyagi, New Delhi (IN); Tanveer A. Faruquie, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/023,110

(22) Filed: Jan. 31, 2008

(65) Prior Publication Data

US 2009/0196427 A1 Aug. 6, 2009

(51) Int. Cl.
*H04N 7/167* (2011.01)

(52) U.S. Cl. .......................................................... 380/239

(58) Field of Classification Search .................. 380/239
See application file for complete search history.

(56) References Cited

U.S. PATENT DOCUMENTS 5,058,159 A 10/1991 Quan
5,796,829 A * 8/1998 Newby et al. .................. 705/54
6,058,363 A 5/2000 Ramalingam
6,081,784 A 6/2000 Tsutsui
6,226,612 B1 5/2001 Srenger et al.
6,505,156 B1 1/2003 Junkawitsch et al.
6,574,338 B1 6/2003 Sachdev
6,862,343 B1 3/2005 Vacek et al.
6,868,403 B1 3/2005 Wiser et al.
6,988,205 B2 1/2006 Walker et al.
7,120,255 B2 10/2006 Cross
7,130,436 B1 10/2006 Tabata et al.
7,146,008 B1 12/2006 Hannah et al.
7,673,315 B1 * 3/2010 Wong et al. ..................... 725/51
2001/0036271 A1 11/2001 Javed
2002/0146122 A1 10/2002 Vestergaard et al.
2003/0169878 A1 * 9/2003 Miles ........................... 380/201
2006/0184790 A1 8/2006 Oliveira et al.
2006/0274856 A1 12/2006 Dunn et al.
2007/0160208 A1 * 7/2007 MacLean et al. ............ 380/210
2008/0226067 A1 * 9/2008 De Haan et al. ............. 380/200

OTHER PUBLICATIONS

"AES encryption scheme," http://www.nist.gov/CryptoToolkit, downloaded on Jan. 10, 2008.
"Secure Real Time transport protocol," http://tools ietf org/html/rfc3711, downloaded on Jan. 10, 2008.
Servetti, et al., "Perception based partial encryption of compressed speech," IEEE Transcations on Speech and Audio Processing, vol. 1, No. 8, 2002.
Servetti et al., "Frequency-selective partial encryption of compressed audio," IEEE ICASSP, 2003.
Silaghi, M, "Spotting subsequences matching a HMM using the average observation probability criterion with application to keyword spotting," AAAI, 2005.

* cited by examiner

*Primary Examiner* — Kambiz Zand
*Assistant Examiner* — Teshome Hailu
(74) *Attorney, Agent, or Firm* — Ryan, Mason & Lewis, LLP

(57) ABSTRACT

Techniques for protecting information in an audio file are provided. The techniques include obtaining an audio file, detecting information beating one or more segments in a speech signal, wherein the information comprises information sought for protection, encrypting the information sought for protection by scrambling the one or more segments using a scrambling filter, and selectively decrypting an amount of the encrypted information, wherein the amount of the encrypted information to be decrypted depends on user access privilege, and wherein selectively decrypting the amount of the encrypted information protects said amount of the encrypted information. Techniques are also provided for protecting information in an audio file.

9 Claims, 7 Drawing Sheets

(ENCRYPTION)

(DECRYPTION)

404

| S1, s2, s3 COMPRESSED SPEECH A B ENCRYPTED PRIVATE INFORMATION | | | |
|---|---|---|---|
| s1 | 0 | $t_1$ | |
| A | $t_1$ | $t_2$ | KEY A |
| s2 | $t_2$ | $t_3$ | |
| B | $t_3$ | $t_4$ | KEY B |
| s3 | $t_4$ | T | |

SYSTEM AND COMPUTER PROGRAM PRODUCT FOR PROTECTING AUDIO CONTENT

CROSS-REFERENCE TO RELATED APPLICATION(S)

The present application is related to a commonly assigned U.S. application entitled "Method for Protecting Audio Content," identified by Ser. No. 12/023,103, and filed on even date herewith, the disclosure of which is incorporated by reference herein in its entirety.

FIELD OF THE INVENTION

The present invention generally relates to audio technology, and, more particularly, to protecting audio content.

BACKGROUND OF THE INVENTION

In a call center, many types of private information are exchanged between agent and customers (for example, credit, card information, personal identification numbers (PINs), telephone numbers, electronic mail (e-mail) addresses, social security numbers (SSNs), etc.). Challenges exist in the ability to automatically protect sensitive information in an audio file and expose it to a particular person depending on his or her role. An example of the access privilege can be as follows.

| Role: | Private information to be protected: |
|---|---|
| IT Administrator | CC number, PIN number, verification number, email id, telephone number, Address |
| Quality Expert | Credit card number, PIN number, verification number |
| Auditor | none |

Existing approaches of protecting audio content include offline encryption (for example, compressing the entire file (naive compression) using an advanced encryption standard (AES) encryption scheme or a data encryption standard (DES) encryption scheme). Other existing approaches include scrambling (for example, permuting a signal in time domain or distorting a signal in frequency domain and then using inverse filter banks), and selective encryption. Additional existing approaches include degrading information reproduction without key and protecting broadcast content by encrypting the packets at transmitter end and decrypting them at the receiver end.

SUMMARY OF THE INVENTION

Principles of the present invention provide techniques for protecting audio content. An exemplary method (which may be computer-implemented) for protecting information in an audio file, according to one aspect of the invention, can include obtaining an audio file, detecting information bearing one or more segments in a speech signal, wherein the information comprises information sought for protection, encrypting the information sought for protection by scrambling the one or more segments using a scrambling filter, and selectively decrypting an amount of the encrypted information, wherein the amount of the encrypted information to be decrypted depends on user access privilege, and wherein selectively decrypting the amount of the encrypted information protects said amount of the encrypted information.

In an embodiment of the invention, an exemplary method for protecting information in an audio file includes the following steps. One or more semantic segments are identified in the audio file, wherein the one or more semantic segments comprise semantic information. The audio file is encrypted depending on the identified semantic information. Access permission is obtained for a user attempting to access the audio file. Also, the audio file is decrypted for a user with access permission.

At least one embodiment of the invention can be implemented in the form, of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1A:
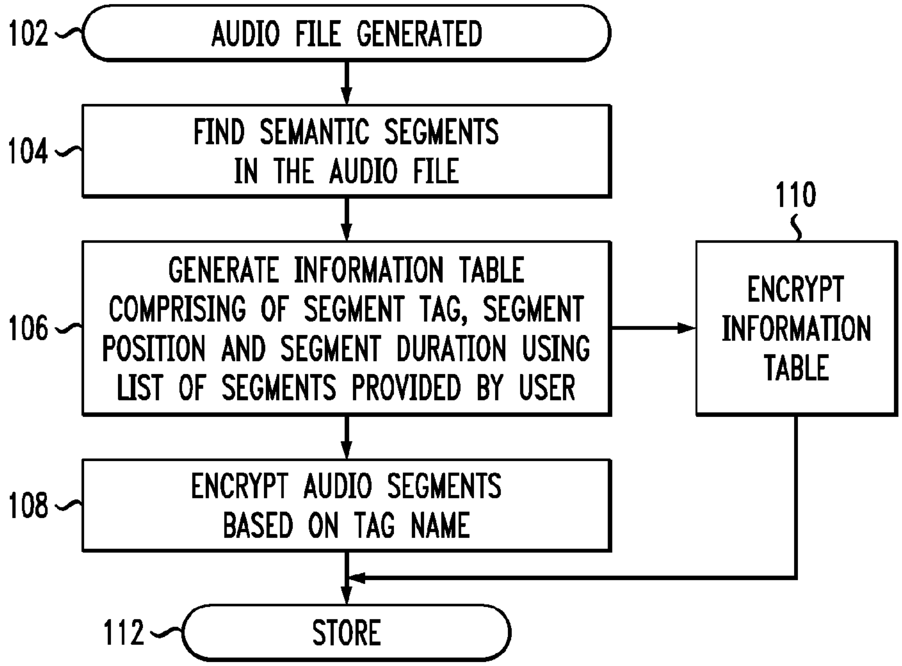
FIG. 1A is a diagram illustrating an exemplary encryption technique, according to an embodiment of the present invention.

Principles of the present invention include automatic role-based privacy protection of sensitive data in audio files. The information (and/or data) is protected as soon as the audio is created. There is no manual intervention (for example, in a call center, there should be no intervention either by the agent or the system administrator).

Principles of the present invention also include selectively encrypting audio segments within an audio file. The encryption is dependent on the information that the segment represents. The encryption can also be based on the customer privacy policy. For example, the customer can say "I want to protect ray e-mail identity and phone number, but not my contact address." Additionally, principles of the invention include selectively decrypting audio segments within an audio file. The decryption can be based on the user role and access permission, the purpose of accessing the file, and/or the information that the segment represents. Also, one or more embodiments of the present invention include an integrated approach of encrypting and decrypting data incorporating user access control and customer preferences.

As described herein, an illustrative embodiment of the present invention includes automatically detecting private information in a speech signal that can be in any language, encrypting the information and optionally compressing it along with the non-private information bearing speech segments. Such techniques allow for privacy protection of sensitive data in audio files while facilitating ease of use.

One or more embodiments of the invention automatically uses the acoustic models used in a generalized speech recognition module or a special recognition module can be constructed to dynamically detect private information bearing speech segments. An example of detecting a private information is to use a general purpose large vocabulary automatic speech recognition system to transcribe an audio file and generate the transcription or N-best transcriptions along with their alignments. The alignments indicate where in the audio file a particular word is recognized.

One can also detect private information in the transcripts or N-best transcripts using string matching or other distance measures. The alignment of the detected segment in the transcript is used to encrypt the corresponding information in the audio file. Alternatively, one can construct word spotting models for private information and use the model to spot private information in the audio. For example, sporting the keyword "credit card," or keyword "social security," etc. The spotted information can be encrypted in the audio file. More generally, privacy grammars can be constructed that, are matched against the audio file to detect private information. These grammars are represented as network graphs to capture possible variations of the occurrence of private information. Any detected private information can be encrypted followed by optional compression.

In a use case, the users may have different access permissions associated therewith. As described herein, one or more embodiments of the present invention accept requests from users, and depending on the level of their access permissions (validated through a user name and password), decrypt only the privacy information bearing segments for which the user has the access permission. The non-private speech segments can be made available along with the decrypted private information segments as a contiguous speech signal.

An administrator of a system, as an example, can define what constitutes private information. By way of example and not limitation, private information can include credit card numbers, PINs, addresses, telephone numbers, SSNs, etc. It should be appreciated, however, that, embodiments of the present invention are not limited to private information and, in general, any event can be defined by the administrator whose occurrences in the audio files can be detected and encrypted automatically.

In one or snore embodiments of the invention, only the sensitive or private information in the audio is encrypted. Also depending on the user privileges, the user is allowed permission to decrypt the relevant portions of the audio. The other portions to which he or she does not have the privileges remain inaudible for this user.

As described herein, principles of the present invention include storing audio files so that any sensitive information contained therein is not available to all users. The non-sensitive information is available to everyone but the availability of sensitive information is based on user privileges. The sensitive or private information in the audio can be encrypted. Also, depending on the user privileges, the user is allowed permission to decrypt the relevant portions of the audio. As noted above, the remaining portions to which he or she does not have corresponding privileges remain inaudible for this user.

Additionally, as described herein, segments refer to specific portions of audio content that contain private or sensitive information that needs to be hidden. The contents of the file, except for this private information, are visible to all the users. Other users who have the requisite privileges can listen to parts of the file to which they are authorized.

FIG. 1A is a diagram illustrating an exemplary encryption technique, according to an embodiment of the present invention. By way of illustration, FIG. 1A depicts the following steps. Step 102 includes generating an audio file. Step 104 includes finding semantic segments in the audio file. Step 106 includes generating an information table comprising of segment tags, segment positions and segment durations using a list of segments provided by a user. The list can contain all of the private information that has to be detected and further encrypted. The list can also be generated by the administrator of the system for the complete enterprise which is the same for every customer, or may vary from customer to customer based on his or her personal privacy policy.

Step 108 includes encrypting the audio segments based on tag name. For example, the basis can be using different, keys for different tags, or different encryption strength for different tags. Step 110 includes encrypting the information table. Also, step 112 includes storing the encrypted material.

Figure 1B:
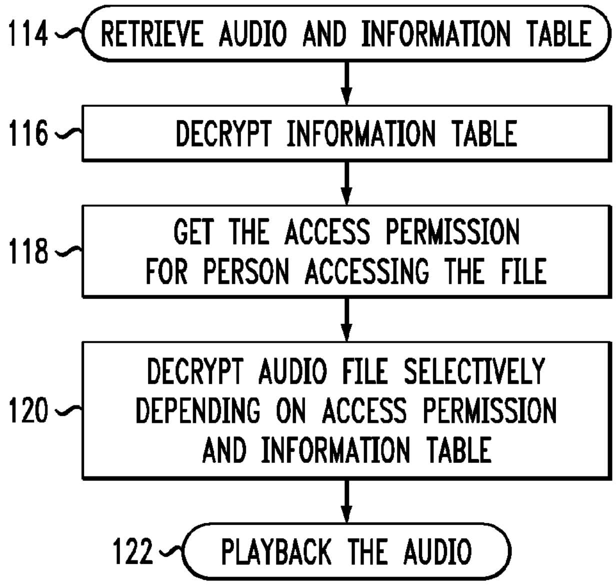
FIG. 1B is a diagram illustrating an exemplary decryption technique, according to an embodiment of the present invention.

FIG. 1B is a diagram illustrating an exemplary decryption technique, according to an embodiment of the present invention. By way of illustration, FIG. 1B depicts the following steps. Step 114 includes retrieving the audio file and information table (that is, from the stored location). Step 116 includes decrypting the information table. Step 118 includes obtaining access permission for the person accessing the file. Step 120 includes decrypting the audio file selectively depending on access permission and the information table. Also, step 122 includes playing-back the audio.

Figure 2:
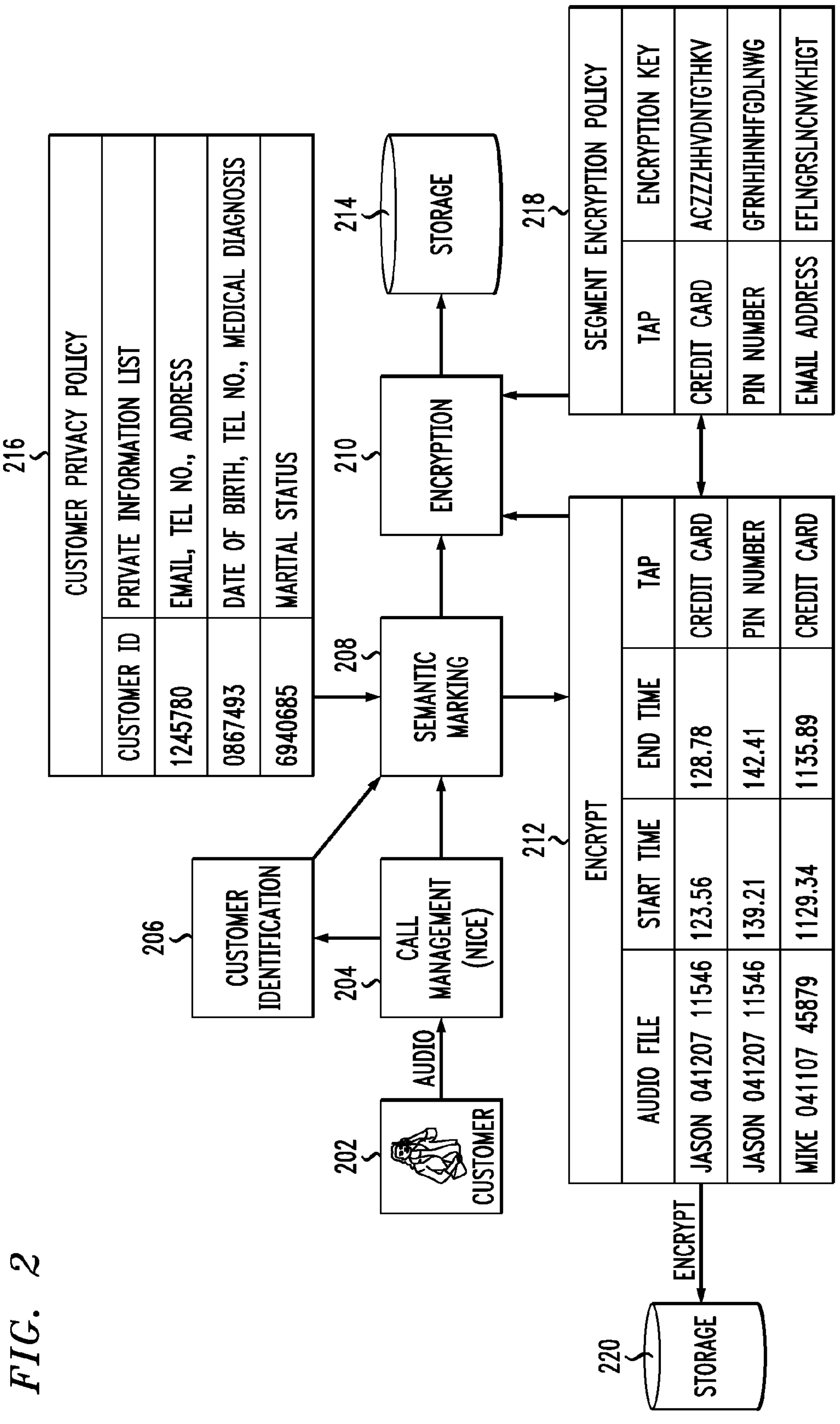
FIG. 2 is a diagram illustrating exemplary encryption techniques, according to an embodiment of the present invention.

FIG. 2 is a diagram illustrating exemplary encryption techniques, according to an embodiment of the present invention. By way of illustration, FIG. 2 depicts the elements of a customer 202, call management 204, customer identification 206, semantic marking 208, encryption 210, an information table 212 that is generated by the semantic marker using a private information detection system, storage 214, a customer privacy policy 216 that identifies for a particular customer which semantic tags should be encrypted and which should not be encrypted (by default, all customers can have the same policy set by the administrator), a table storing the encryption policy for each semantic tag 218 and storage 220.

During encryption, one can use a user-defined private information list and encrypt all of the information specified in the list along with other private information. During decryption, the user-defined private information is exposed to people only with specified roles.

Figure 3:
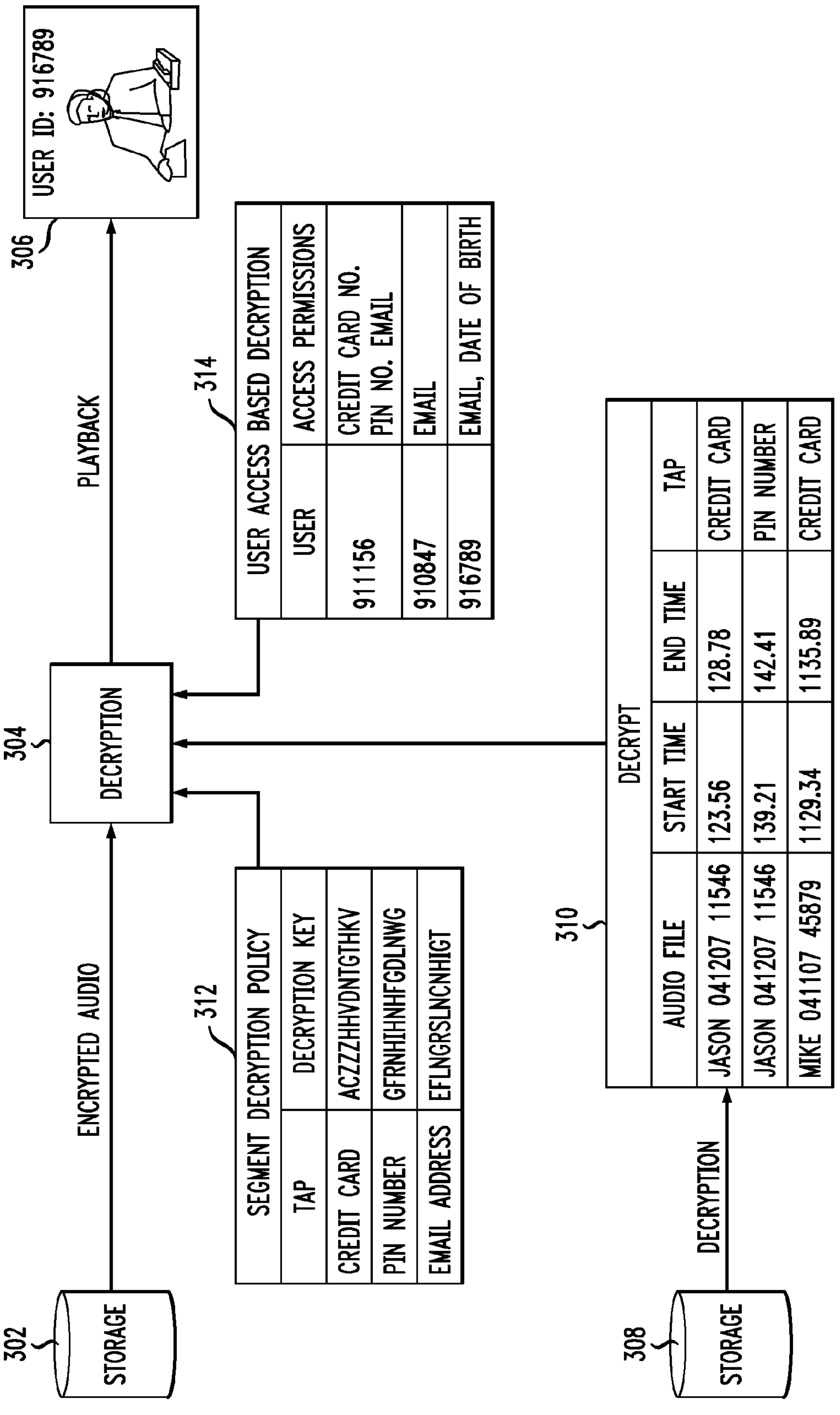
FIG. 3 is a diagram illustrating exemplary decryption techniques, according to an embodiment of the present invention.

FIG. 3 is a diagram illustrating exemplary decryption techniques, according to an embodiment of the present invention. By way of illustration, FIG. 3 depicts the elements of storage (for audio) 302, decryption 304, a person accessing the audio file 306, storage (for an information table) 308, an information table 310 (for example, the information table 212 generated in FIG. 2), and a table 312 for storing the decryption policy for each semantic tag (for example, complimenting the encryption table 218 of FIG. 2).

During decryption, only those segments which have the requisite user access permissions are decrypted. Decryption is equivalent to inverse filtering of the corresponding tag and applying it to the audio segment. The audio file can be decrypted and played back to the user. Also, the decryption module can be a plug-in in the media player.

Figure 4:
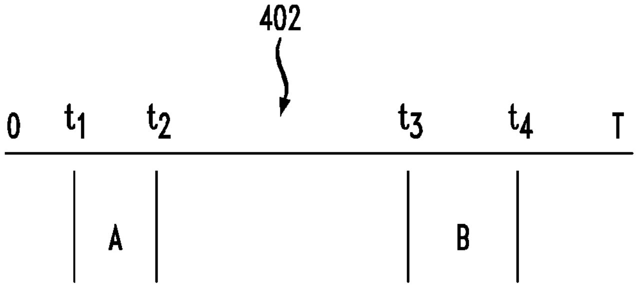
FIG. 4 is a diagram illustrating exemplary encryption and/or decryption techniques with compression, according to an embodiment of the present invention.

FIG. 4 is a diagram illustrating exemplary encryption and/or decryption techniques with compression, according to an embodiment of the present invention. By way of illustration, FIG. 4 depicts an audio file 402 with two detected segments tagged as |A| and |B| and a table 404 that lists the segments audio file 402 is divided into and the corresponding keys which will be used to encrypt the segments. As illustrated in FIG. 4, A and B are the segments containing private information. They are chopped off along with the time label, and encrypted (via, for example, an encryption key and/or scrambling). The information table can also be encrypted. The rest of the segments are compressed using lossy and/or lossless speech compression techniques. To get back the original signal, one can decompress s1, s2, s3 and glue with decrypted A and B.

Figure 5A:
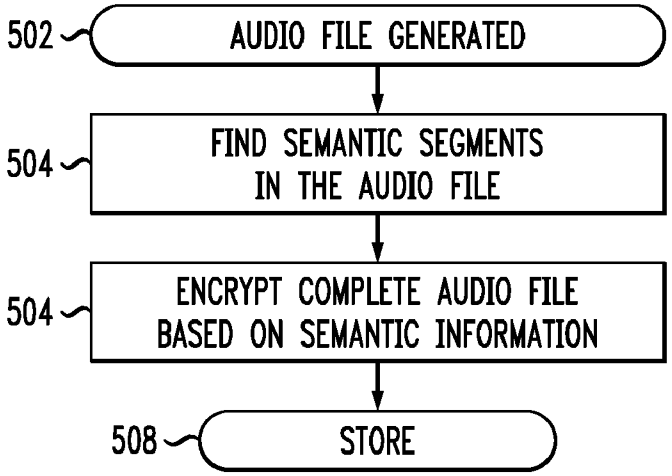
FIG. 5A is a diagram illustrating an exemplary encryption technique, according to an embodiment of the present invention.

FIG. 5A is a diagram illustrating an exemplary encryption technique, according to an embodiment of the present invention. FIG. 5A depicts the following steps. Step 502 includes generating an audio file. Step 504 includes finding semantic segments in the audio file. Step 506 includes encrypting the complete (that is, entire) audio file based on semantic information. Also, step 508 includes storing the encrypted material.

There can be an ordering of the semantic tags that are to be encrypted. For example, a high to low strength ordering is ({CC No, PIN No}, {Email, DOB}, . . . ). During encryption, the entire audio file, rather than a segment of the file, can be encrypted. The encryption key is determined by the strength of the ordering.

Figure 5B:
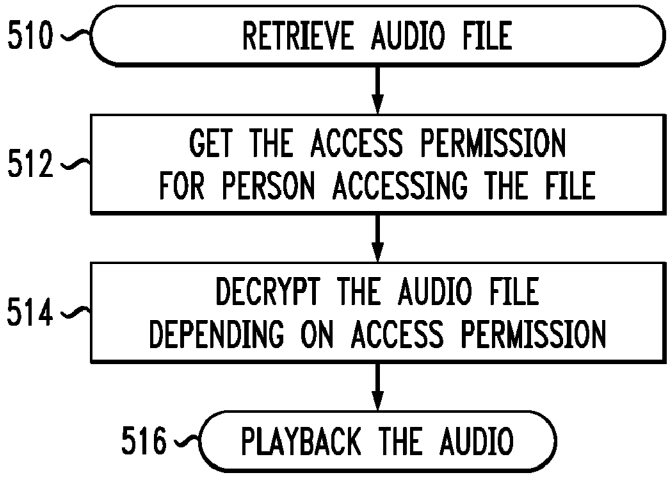
FIG. 5B is a diagram illustrating an exemplary decryption technique, according to an embodiment of the present invention.

FIG. 5B is a diagram illustrating an exemplary decryption technique, according to an embodiment of the present invention. FIG. 5B depicts the following steps. Step 510 includes retrieving the audio file from the stored location. Step 512 includes obtaining the access permission for the person accessing the file. Step 514 includes decrypting the audio file depending on the access permission. Also, step 516 includes playing-back the audio to a person with access permission.

The decryption can be based on the user who is accessing the file and the strength level that the user is allowed to access. If a user has the privilege to decrypt a file of a given strength or higher, the file (of that strength or lower) is decrypted. Otherwise, the file is not decrypted. A trivial case is when all of the tags are assigned equal strength.

Figure 6:
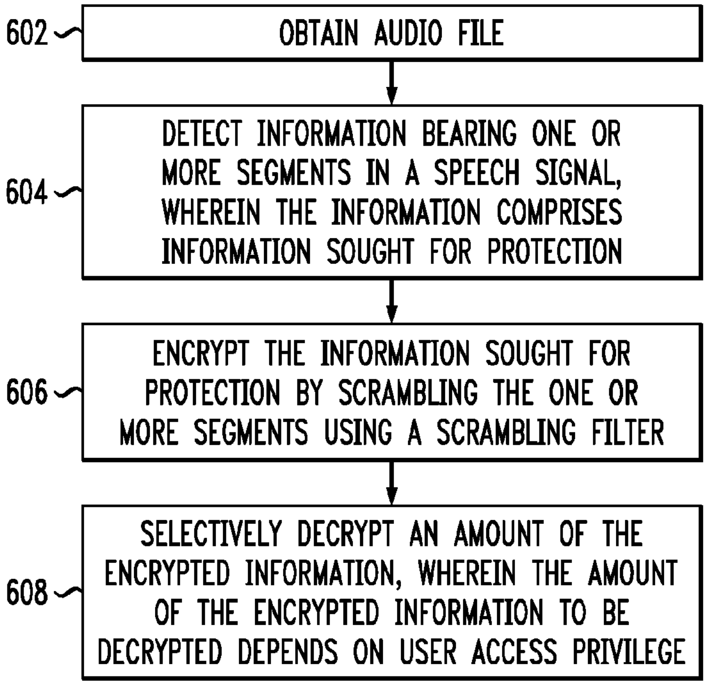
FIG. 6 is a flow diagram illustrating techniques for protecting information in an audio file, according to an embodiment of the present invention.

FIG. 6 is a flow diagram illustrating techniques for protecting information in an audio file, according to an embodiment of the present invention. Step 602 includes obtaining an audio file. The audio file can include, for example, a mono channel file or a multi-channel file. Also, the audio file may include multiple speakers (for example, a customer and an agent). The speakers can be, for example, on a stereo channel and the techniques described herein can be repeated for both of the channels. Also, this can be extended to additional channels.

Step 604 includes detecting information bearing one or more segments in a speech signal, wherein the information comprises information sought for protection. Also, in one or more embodiments of the present invention, information not sought for protection bearing one or more segments can be compressed using a lossy and/or lossless compression algorithm, A lossy compression algorithm exploits the characteristics of a speech signal (for example, MPEG-1 audio layer 3 (MP3) compression or linear predictive coding, etc.). Additionally, the information sought for protection can be compressed using one or more lossless techniques. An example of audio lossless compression is MPEG-4 audio lossless coding (ALC). An example of lossy coding is MPEG3. This is applicable to lossy techniques as well if the speech segment bearing private information is first compressed and then encrypted. If the segment is encrypted and then compressed, then only lossless compression will, work.

Also, one or more embodiments of the invention include classifying the information sought for protection into categories. The categories can be, for example, based on levels of confidentiality of the information sought for protection. Additionally, classifying the information may include using a list of one or more segments provided by a user.

Step 606 includes encrypting the information sought for protection by scrambling the one or more segments using a scrambling filter. The encrypting and/or filter can be based on the identified segments. Encrypting the information sought for protection can include using at least one of an AES and a DES encryption technique. Also, encrypting the information can include using an encryption key, wherein the encryption key used is based on a label of a segment.

Step 608 includes selectively decrypting an amount of the encrypted information, wherein the amount, of the encrypted information to be decrypted depends on user access privilege, and wherein selectively decrypting the amount of the encrypted information protects said amount of the encrypted information. Selectively decrypting is dependent on a label of each segment. The techniques illustrated in FIG. 6 may also include the step of playing-back the audio file for a selected user.

The techniques illustrated in FIG. 6 may also include the step of storing the encrypted information in a database. Storing the encrypted information in a database can include storing all time position information about the segments (both protected and non-protected) and further encrypting this time position information. Storing the encrypted information can also include storing the information about identified segments after encryption. Also, the encrypted audio file and the segment information can be received and/or retrieved by a user from the database. Additionally, one or more embodiments of the invention can include identifying one or more languages in the audio file.

Figure 7:
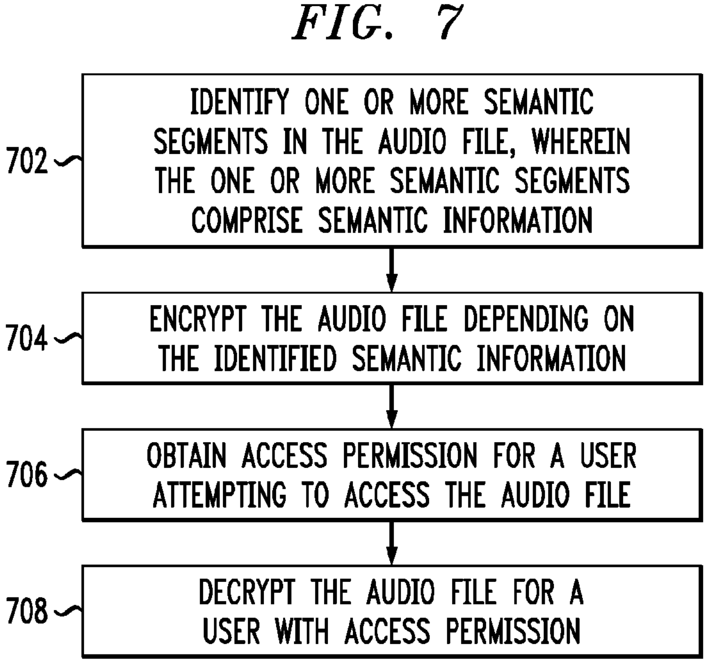
FIG. 7 is a flow diagram illustrating techniques for protecting information in an audio file, according to an embodiment of the present invention.

FIG. 7 is a flow diagram illustrating techniques for protecting information in an audio file, according to an embodiment of the present invention. Step 702 includes identifying one or more semantic segments in the audio file, wherein foe one or more semantic segments comprise semantic information. Step 704 includes encrypting the audio file depending on the identified semantic information. Step 706 includes obtaining access permission for a user attempting to access the audio file. Step 708 includes decrypting the audio file for a user with access permission. The techniques illustrated in FIG. 7 may also include the step of storing the encrypted information in a database. Additionally, the techniques illustrated in FIG. 7 may also include the step of playing-back the audio file for the user with access permission.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of a system including a memory and at least one processor that is coupled to the memory and operative to perform exemplary method steps.

Figure 8:
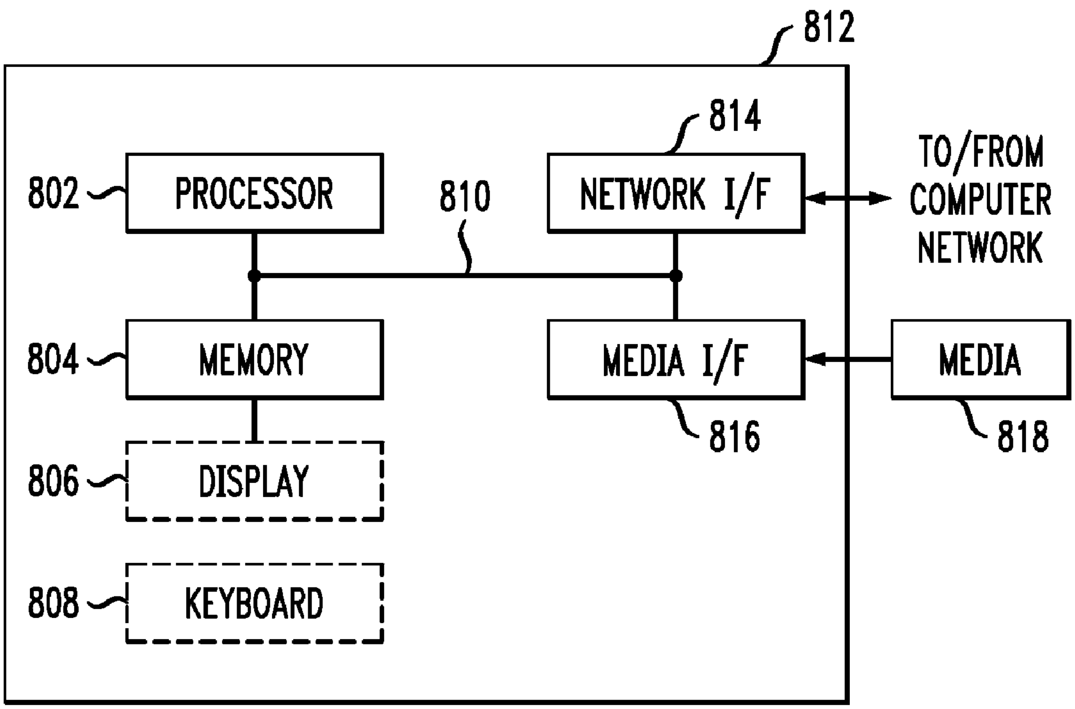
FIG. 8 is a system diagram of an exemplary computer system on which at least one embodiment of the present invention can be implemented.

At present, it is believed that the preferred implementation will make substantial use of software running on a general-purpose computer or workstation. With reference to FIG. 8, such an implementation might employ, for example, a processor 802, a memory 804, and an input and/or output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 802, memory 804, and input and/or output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any system for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 804), magnetic tape, a removable computer diskette (for example, media 818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A system, preferable a data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input, and/or output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, selectively decrypting audio segments within an audio file based on user role and access permission.

Although illustrative embodiments of the present invention have been described herein with reference to the accompanying drawings, it is to be understood that the invention is not limited to those precise embodiments, and that various other changes and modifications may be made by one skilled in the art without, departing from the scope or spirit of the invention.

What is claimed is:

1. A computer program product comprising a tangible computer useable recordable storage medium having computer useable program code for protecting information in an audio file, said computer program product including:

computer useable program code for obtaining an audio file;

computer useable program code for detecting semantic information in the audio file bearing one or more semantic segments in a speech signal, wherein the semantic information identifies each of the one or more segments containing information sought for protection and comprises a segment tag denoting nature of information in each segment containing information sought for protection;

computer useable program code for encrypting the one or more segments containing information sought for protection by scrambling the one or more segments using a scrambling filter, wherein encrypting the one or more segments containing information sought for protection is based on the segment tag for each segment containing information sought for protection, wherein each segment tag corresponds to an encryption strength level; and computer useable program code for selectively decrypting zero or more of the encrypted segments based on user access privilege, wherein user access privilege denotes the encryption strength level at and under which the user is permitted to decrypt, and.

2. The computer program product of claim 1, further comprising computer useable program code for storing the encrypted information in a database.

3. The computer program product of claim 1, further comprising computer useable program code for classifying the information sought for protection into one or more categories.

4. The computer program product of claim 3, wherein the computer useable code for classifying the information comprises:

computer useable program code for using a list of semantic information provided by a user.

5. A computer program product comprising a computer useable medium having computer useable program code for protecting information in an audio file, said computer program product including:

computer useable program code for identifying one or more semantic segments in the audio file, wherein the one or more semantic segments comprise semantic information identifying each of one or more segments containing information sought for protection and comprising a segment tag denoting nature of information in each segment containing information sought for protection;

computer useable program code for encrypting the audio file depending on the identified semantic information, wherein encrypting the audio file depending on the identified semantic information comprises encrypting the one or more segments containing information sought for protection based on the segment tag for each segment containing information sought for protection, wherein each segment tag corresponds to an encryption strength level;

computer useable program code for obtaining user access permission for a user attempting to access the audio file, wherein user access permission denotes the encryption strength level at and under which the user is permitted to decrypt; and computer useable program code for decrypting zero or more of the encrypted segments of the audio file for a user based on user access permission.

6. A system for protecting information in an audio file, comprising:

a memory; and at least one processor coupled to said memory and operative to:

obtain an audio file;

detect semantic information in the audio file bearing one or more semantic segments in a speech signal, wherein the semantic information identifies each of the one or more segments containing information sought for protection and comprises a segment tag denoting nature of information in each segment containing information sought for protection;

encrypt the one or more segments containing information sought for protection by scrambling the one or more segments using a scrambling filter, wherein encrypting the one or more segments containing information sought for protection is based on the segment tag for each segment containing information sought for protection, wherein each segment tag corresponds to an encryption strength level; and selectively decrypt zero or more of the encrypted segments based on user access privilege, wherein user access privilege denotes the encryption strength level at and under which the user is permitted to decrypt, and.

7. The system of claim 6, wherein the at least one processor coupled to said memory is further operative to store the encrypted information in a database.

8. The system of claim 6, wherein the at least one processor coupled to said memory is further operative to classify the information sought for protection into one or more categories.

9. The system of claim 8, wherein in classifying the information, the at least one processor coupled to said memory is further operative to use a list of semantic information provided by a user.

* * * * *